United States Patent

[11] 3,564,124

[72] Inventor Richard G. Popovich
Georgetown, Mass.

[21] Appl. No. 720,247
[22] Filed Apr. 10, 1968
[45] Patented Feb. 16, 1971

*Primary Examiner*—Robert L. Griffin
*Assistant Examiner*—John C. Martin
*Attorneys*—F. H. Henson, C. F. Renz and A. S. Oddi

[54] CHROMA-GAIN CONTROL AND COLOR KILLER CIRCUITS
10 Claims, 3 Drawing Figs.

[52] U.S. Cl. ........................................................ 178/5.4
[51] Int. Cl. ........................................................ H04n 9.84
[50] Field of Search ........................................... 178/5.4 (CK), 5.4 (ACC), 7.5 (DC), 7.3; 325/410

[56] References Cited

UNITED STATES PATENTS

| | | | |
|---|---|---|---|
| 2,951,115 | 8/1960 | Iannuzzi et al. | 178/5.4CK |
| 3,308,231 | 3/1967 | Heuer | 178/5.4CK |
| 3,435,131 | 3/1969 | Krug | 178/5.4 |
| 3,502,797 | 3/1970 | Eckenbrecht | 178/5.4CK |

ABSTRACT: The present disclosure relates to color television receiver circuitry for performing the color killer function in the color receiver as well as applying automatic gain control to the chroma and band-pass amplifying stages. In response to control signals developed in the receiver, for example in the color killer detector thereof, the present circuit is operative when color signals are received to supply automatic gain control signals to both the chroma and band-pass amplifying stages to permit the chrominance signals to be amplified therein at the desired gain levels. When monochrome signals are received, the present circuit, in response to the control signals, is operative as a color killer to turn off the band-pass amplifier stage to prohibit spurious signals from being translated therethrough causing interference with the desired monochrome reception.

WITNESSES
Theodore F. Wrobel
Leon M. Garman

INVENTOR
Richard G. Popovich
BY
ATTORNEY

CHROMA-GAIN CONTROL AND COLOR KILLER CIRCUITS

BACKGROUND OF THE INVENTION

The present invention relates to circuitry for use in color television receivers and, more particularly, to circuitry for performing color killer and chroma automatic gain control functions in color television receivers.

It has been the usual practice in color television receivers to provide the chroma amplifier with chroma automatic gain control (AGC), while the color killer function is performed by turning off a second chroma amplifier, or as it is commonly called the band-pass amplifier. The chroma AGC and color killer voltages are commonly developed in the color killer detector in the color receiver. The chroma AGC voltage usually is applied only to the chroma amplifier and not to the band-pass amplifier, hence it becomes necessary to utilize an expensive, high-gain tube with a very sharp cutoff characteristic in the chroma amplifier in order to provide sufficiently high chroma AGC loop gain in the chroma amplification channel of the receiver. From the standpoint of cost, it would be highly desirable to permit the use of a less expensive lower gain tube with a more remote cutoff characteristic in the chroma amplifier and still provide sufficiently high chroma AGC loop gain required for proper receiver operation. Moreover, it would be advantageous to provide the band-pass amplifier with chroma AGC while still permitting the use of this stage to complete the color killer function within the receiver.

SUMMARY OF THE INVENTION

Broadly, the present invention provides circuitry for use in a color television receiver for performing the color killer and chroma automatic gain control functions wherein: in response to color signals being received, chroma AGC is supplied to the chroma and band-pass amplifying stages of the receiver, while, in response to monochrome signals being received, the band-pass amplifier is rendered nonconductive.

DESCRIPTION OF THE PREFERRED EMBODIMENTS

Figure 1:
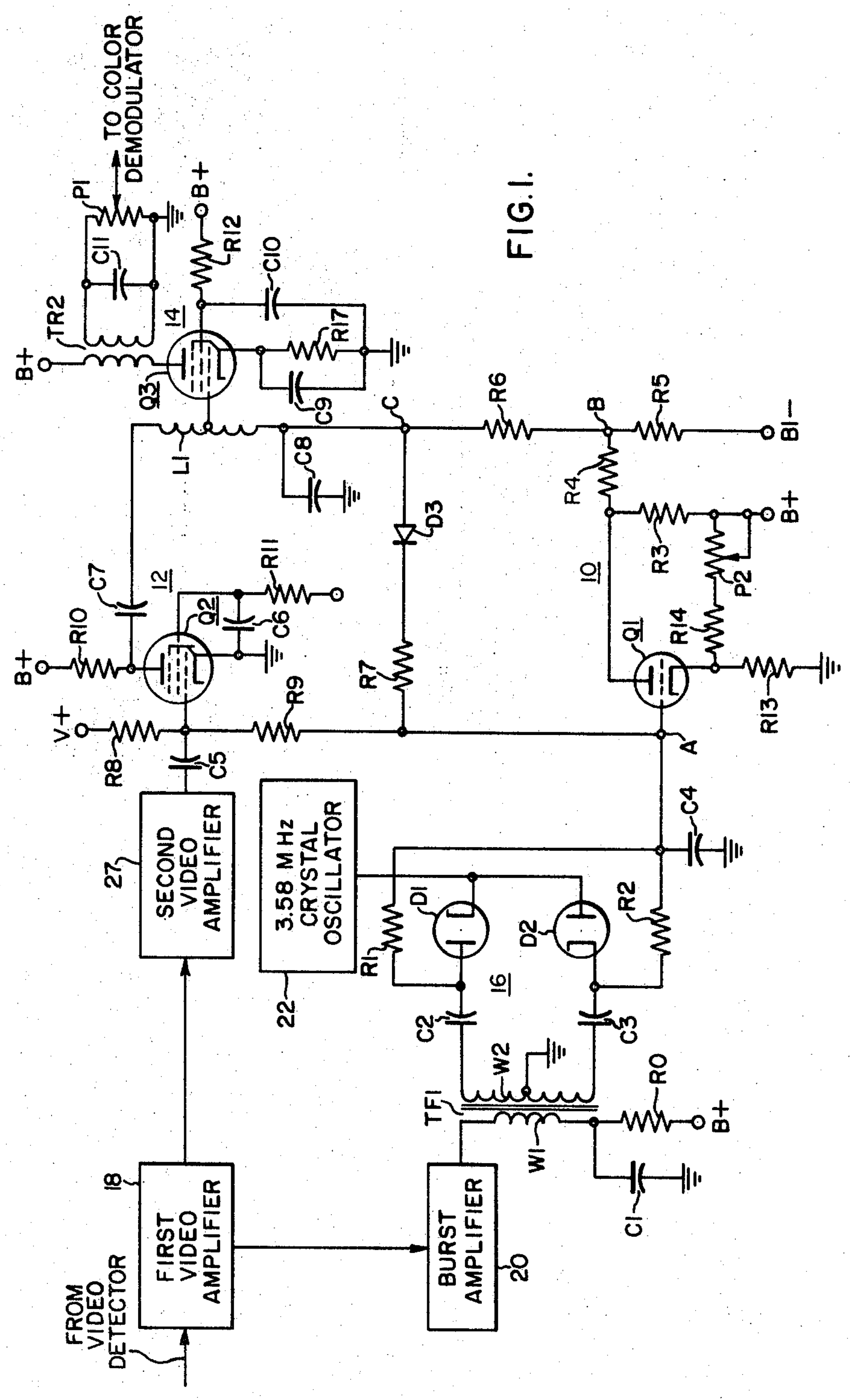
FIG. 1 is a schematic-block diagram of one embodiment of the present invention.

FIG. 1 shows one embodiment of the present invention which may be incorporated into a color television receiver. Only the pertinent portions of a color receiver is shown in FIG. 1 for the purposes of simplicity and to point out particulars of the present invention. It should be understood that the stages of the color receiver not shown may comprise those found in a standard design. In FIG. 1 a color and AGC circuit 10 is provided including a triode vacuum tube Q1. In response to a control signal developed at the point A at the grid of the tube Q1, the color killer AGC circuit 10 provides chroma AGC voltages to both the chroma amplifier 12, including a pentode vacuum tube Q2, and a band-pass amplifier 14 including a pentode vacuum tube Q3, when color information is being received. Whenever a monochrome information is being received the control signal at point A is such that the color killer and AGC circuit 10 provides a color killer output therefrom to deactivate the band-pass amplifier 14 thereby completing the color killer function in the receiver.

The control voltage developed at the point A is supplied by a color killer detector 16 which is commonly provided in a color television receiver. The development of the control voltage at the point A is commonly done in color television receivers; however for a better understanding of the present invention, the manner in which this control voltage is developed will now be explained.

Assume first that color signals are being received by the receiver of FIG. 1 and that the composite video signal from the video detector of the receiver is applied to a first video amplifier 18. The composite video signal includes a chrominance component and a 3.58 MHz color burst signal. As is well known the color burst signal includes a minimum 8 cycles and appears on the backporch of the horizontal blanking pedestal of the transmitted color television signals. The amplitude of the color burst signal is indicative of the amplitude of the color television signals. An output from the first video amplifier 18 is applied to a burst amplifier 20, which is conductive only during the horizontal retrace time and cutoff during the horizontal trace time. Thus, amplifier color burst signals are supplied to the primary winding W1 of a burst transformer TF1. The primary winding W1 of the burst transformer is coupled to ground via a capacitor C1, with a source of B+ potential being coupled through a resistor R1 and the primary winding W1 of the burst amplifier 20. The secondary winding W2 of the first transformer TF1 is center tapped and has the center tap grounded. The ends of the secondary winding W2 are coupled, respectively, via capacitors C2 and C3 to the color killer detector 16. The color killer detector 16 includes a pair of rectifiers D1 and D2. The capacitor C2 is connected to the anode of the diode D1, and the capacitor C3 is connected to the cathode of the diode D2. The cathode and anode of the rectifiers D1 and D2, respectively, are commonly connected together and are supplied by the 3.58 MHz crystal oscillator 22 of the receiver. A resistor R1 is coupled between the anode of the rectifier D1 and the point A at the grid of the tube Q1, and a resistor R2 is coupled between the cathode of the rectifier D2 and the point A. A filter capacitor C4 is connected between the point A and ground.

When the receiver is in synchronism, the color burst signal is in phase with the output of the 3.58 MHz crystal signal oscillator 22. The burst signals applied to the anode and cathode of the rectifiers D1 and D2, respectively, being supplied from opposite ends of the center-tapped secondary winding W2 will be 180° out of phase with each other. However, the cathode and anode, respectively, of the rectifiers D1 and D2 being commonly connected and supplied by the 3.58 MHz crystal oscillator 22 will be in phase, and, thus, an unbalanced condition will exist in the color detector 16, with one of the rectifiers D1 and D2 heavily conducting, while the other diode will be substantially nonconducting during the time that color burst signals are being received. The rectifiers D1 and D2 are so poled with respect to the burst transformer TF1 that the diode D2 is the heavily conductive one; thus, a negative control voltage is developed at the point A being stored on the capacitor C4. This voltage will vary according to the amplitude of the burst signals and may, for example, have a value of approximately −5 volts.

The negative control voltage applied to the grid of the tube Q1 causes it to be turned off and permits the plate thereof to be at a relatively high positive potential, in that the plate is coupled to B+ potential via a resistor R3. The cathode of the tube Q1 is connected to ground via a cathode resistor R13. A voltage divider network is provided including the resistor R3, a resistor R4 and a resistor R5. These resistors are respectively connected in series between the B+ source and a B− source. These resistors are so selected that the voltage at a point B, between the resistors R4 and R5, is slightly positive when the tube Q1 is nonconductive. The B+ potential may, for example, be +275 volts, and the B− voltage may, for example be −150 volts in a typical embodiment.

A series circuit including a resistor R6, a diode D3, and a resistor R7 is connected between the points B and A, with the anode of the diode D3 poled toward the point B and the cathode thereof poled toward the point A. The resistor R6 is selected to have a high resistive value as compared to the resistor R7. Therefore, a delayed chroma AGC voltage is developed at the point C, at the junction of one end of the resistor R6 and the anode of the diode D3. The AGC voltage at C is supplied to the band-pass amplifier 14 via an interstage coil L1, which has one end coupled to the point C. The coil L1 includes a tap thereon which is connected to the control electrode of the vacuum tube Q3 which comprises the active element of the band-pass amplifier 14. Delayed AGC voltage is also supplied to the chroma amplifier 12, with a voltage divider including resistors R8 and R9 being connected in series between a V+ source, which may be a low positive DC supply of, for example, +25 volts, and the point A. The junction point of the resistors R8 and R9 is connected to the control grid of tube Q2 which comprises the active element of the chroma amplifier 12. The resistor R8 is selected to have a much larger resistive value than the resistor R9, so that the AGC voltage provided to the chroma amplifier tube Q2 is delayed with respect to the control voltage at the point A. The reason for the delay of the AGC voltages as supplied to the chroma amplifier 12 and the band-pass amplifier 14 with respect to the control voltage at the point A is to insure maximum gain of the chroma channel before the color killer amplifier is activated which would cause the chroma channel to be turned off. Thus, with both the chroma amplifier 12 and band-pass amplifier 14 receiving delayed AGC signals, the chroma channel is in its normal operating condition for the amplification of the chrominance component of the composite video signal.

In this mode of operation, the output of the first video amplifier 18 is applied to the second video amplifier 24, whose output is coupled via a capacitor C5 to the control grid of the chroma amplifier tube Q2. The plate of tube Q2 is coupled through an anode resistor R10 to the B+ source, while the cathode thereof is grounded. The chroma amplifier 12 is connected in a standard configuration, with the cathode and suppressor grids tied together and the screen grid coupled by a capacitor C6 to the cathode. The B+ source is coupled through a resistor R11 to the screen grid. The amplified output of the chroma amplifier tube Q2 of the plate thereof is so coupled via a capacitor C7 to the top end of the chroma interstage coil L1, with the bottom end of the coil L1 AC coupled to ground via a capacitor C8. The tap point on the interstage coil L1 is connected to the control grid of the band-pass amplifier tube Q3. In the cathode circuit of the tube Q3 is connected an RC circuit including a resistor R11 and a capacitor C9. The suppressor and cathode electrodes of the tube Q3 are connected together, with a capacitor C10 connecting the screen grid to ground. The B+ potential is connected via a resistor R12 to the screen grid. The B+ potential is coupled through the primary winding of the band-pass transformer TR2 to the plate of the tube Q3. A capacitor C11 and the color control potentiometer P1 are connected across the secondary of the band-pass transformer TR2, so that the amplified chrominance signals appear across the potentiometer P2. From the tap of the potentiometer P1, the output is supplied to the color demodulators, not shown, of the receiver for demodulation therein and subsequent application to the respective electrodes of the color cathode ray tube of the receiver.

The operation as described above will proceed as long as color burst signals are received with the color killer detector 16 providing a control at point A to activate the color killer and chroma AGC circuit 10 in such a fashion to provide delayed AGC voltages to both the chroma amplifier 12 and the band-pass amplifier 14 to thereby control the gain of the chroma channel of the receive, in that the amplitude of the color burst signals are proportional to the amplitude of the signal received. By providing chroma AGC to both chroma amplifiers 12 and the band-pass amplifier 14, the chroma amplifier tube Q2 may be selected to have a lower gain and a less rapid cutoff characteristic than would otherwise be required if AGC were only applied to the chroma amplifier 12. Sufficient chroma AGC loop gain is provided through the use of the two chroma stages rather than just one, which permits the use of a less costly tube Q2 for the chroma amplifier 12. The delayed AGC voltages applied to both the chroma amplifier 12 and the band-pass amplifier 14 maintain a constant chroma output to be supplied to the color demodulators of the receiver as desired, even though the chroma level input to the chroma amplifier 12 is as normally occurs from station to station, or when the receiver is being fine tuned around the proper tuning frequency.

The color killer operation of the circuitry of FIG. 1 will now be described assuming that a monochrome television signal is being received hence including no color burst signals therein. In normal black and white reception with no color burst signal being received, the burst amplifier 20 is not activated, and, therefore, the burst transformer TF1 supplies no input to the color killer detector 16. The 3.58 MHz crystal oscillator 22, however, does supply 3.58 MHz input signals to the common cathode-anode connection of the rectifiers D1 and D2. However, in that the anode and cathode electrodes, respectively, of the rectifiers D1 and D2 are connected through resistors R1 and R2 to a common point, i.e. point A, the voltage appearing at this point will be substantially zero volts for this balanced mode of operation.

In response to the voltage at point A being substantially zero, the chroma amplifier tube Q2 will be biased to its maximum gain condition and tube Q1 will be turned on causing the plate thereof to drop to a slightly positive voltage. A cathode resistor R13 is provided for the tube Q1, and a color killer threshold control is also provided including a potentiometer P2 and a resistor R14 connected between the B+ source and the cathode of the tube Q1. With the adjustment of the potentiometer P2 variable cathode bias may be supplied to the tube Q1 to set the conduction point thereof and to make adjustments for variations in the cutoff voltage of this tube.

When the tube Q1 is turned on the voltage at the point B between the resistors R4 and R5 drops to a negative voltage as determined by the voltage divide between the low positive voltage at the plate of the tube Q1 and negative voltage from the B1− source. This negative voltage at the point B is so selected to be of sufficient magnitude to reverse bias the diode D3 through the resistors R6 and R7. This thereby isolates the voltage at the points B and C from the control voltage at the point A. A negative voltage thus appears at the point C which is applied via the interstage coil L1 and the tap thereon to the control grid of the band-pass amplifier tube thereby turning off this tube. With the tube Q3 turned off the chroma channel is blocked from translating color information therethrough to the color demodulators of the receiver, and thus the color killer function within the receiver is performed. It can thus be seen that through the use of the diode D3 and the circuit arrangement as shown in FIG. 1 isolation is provided between control signals at the point A and the color killer function turning off the band-pass amplifier 14 at the point C.

When color television signals are again received, the burst amplifier 20 will be activated to cause the color killer detector 16 to provide a negative control voltage at the point A to cause the tube Q1 to turn off and permit the forward biasing of the diode D3. Delayed chroma AGC signals will thus be provided to both the chroma amplifier 12 and the band-pass amplifier 14, as previously explained, to supply a constant gain chroma output to the color demodulators of the receiver at the output of the band-pass amplifier 14.

Figure 2:
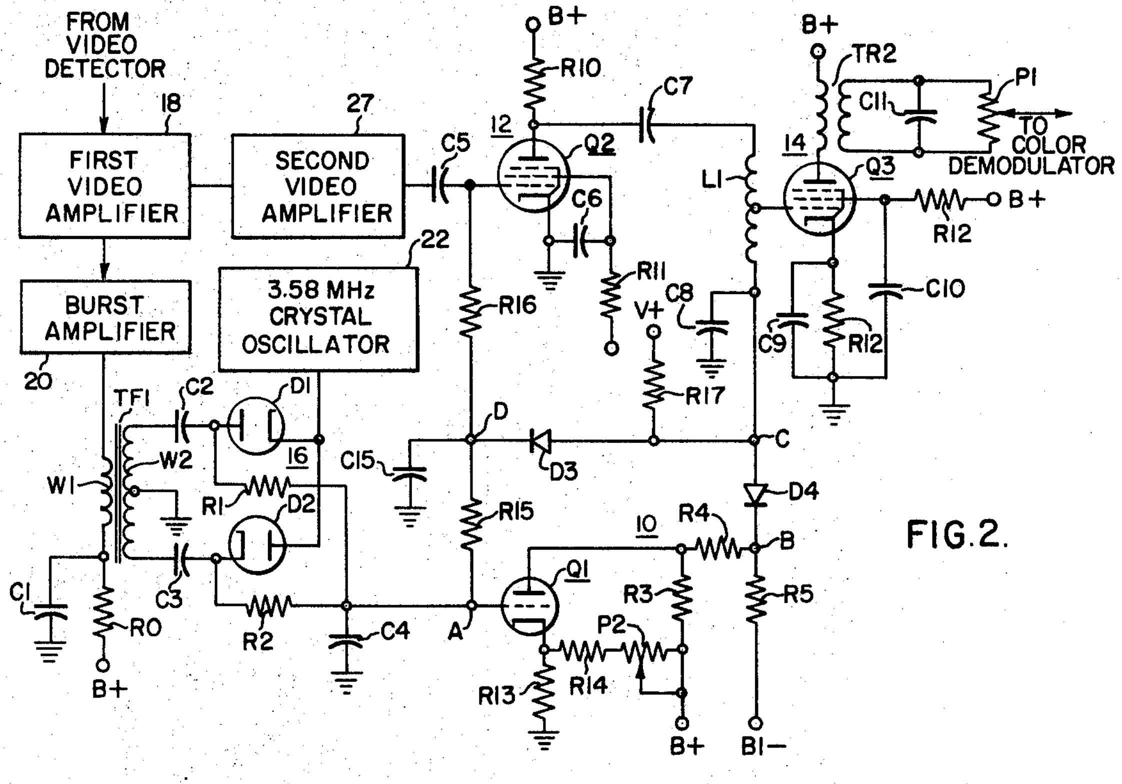
FIG. 2 is a schematic-block diagram of another embodiment.

In FIG. 2 another embodiment of the present invention for performing the chroma AGC and color killer functions is shown wherein components performing similar functions are identified in the same manner as in FIG. 1. When color signals are being received, the burst signal component thereof causes a negative control voltage to be developed at point A at the grid of the tube Q1 as previously discussed. In response to the negative control signal, the tube Q1 is turned off so that the plate of the tube Q1 is at a relatively high positive value. The diode D3 is connected between the point C and a point D at the junction of a pair of resistors R15 and R16. The resistors are connected, respectively, between the point A and the control grid of the chroma amplifier tube Q2. The anode of the diode D3 is connected through a resistor R17 to the V+ low positive DC supply, and the cathode thereof is connected to the point D which is AC coupled to ground via a capacitor C15. With the tube Q1 turned off the diode D3 is forward biased through the resistors R17 and R15 connected between V+ and the negative voltage at the point A. The voltage at the points C and D is thus substantially the same. The values of the resistors R17 and R15 are so selected to give the desired delayed AGC voltage, which is supplied to the chroma amplifier 12 via the isolating resistor R16 and to the bypass amplifier 14 through the interstage coil L1 via the tap thereon to the control grid of the band-pass amplifier tube Q3.

With the tube Q1 turned off, the voltage at the point B is positive as defined by the voltage divider network including resistors R3, R4 and R5 between the B+ and B− sources. A diode D4 is connected between the point C and B from anode to cathode, respectively, so that the diode D4 is reverse biased due to the positive voltage at point B supplied at its cathode with respect to its anode at the point C. In the reverse biased state the diode D4 therefore isolates the color killer function of the tube Q1 from the AGC functions.

When a monochrome television signal is received, the control voltage at the point A goes to substantially zero volts. This causes the chroma amplifier tube Q2 to be biased to its maximum gain condition, and turns on the tube Q1 which causes the voltage at the point B to become negative as previously described. The diode D4 connected between the points B and C becomes forward biased so that the point C is essentially at the negative potential of the point B. The negative voltage at the point C is applied via the interstage coil L1 to the control grid of the band-pass amplifier tube Q3 thereby turning off this tube and completing the color killer function. With the diode D4 being forward biased, the diode D3 is reverse biased since the voltage at the cathode of the diode D3, at the point D, is essentially zero volts DC, while the voltage at the anode thereof at the point C is negative. The reverse biasing of the diode D3 thus isolates the color killer function and the chroma AGC function.

Figure 3:
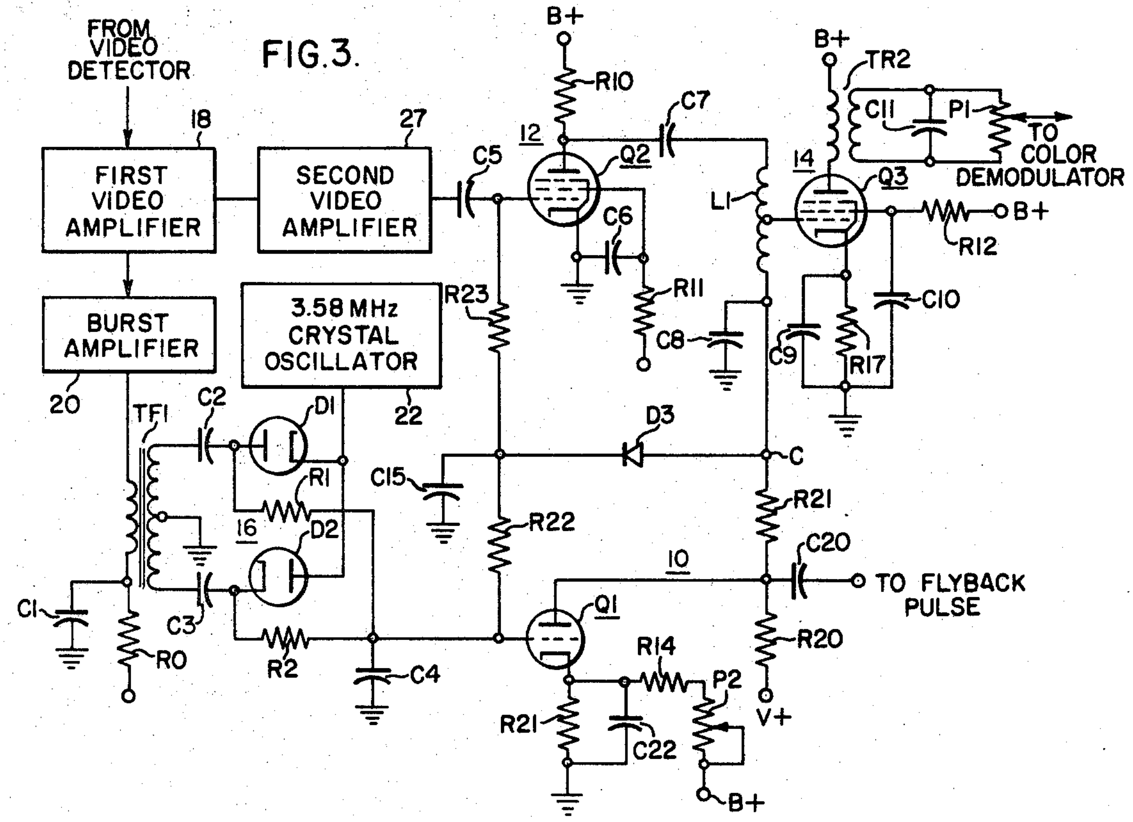
FIG. 3 is a schematic-block diagram of a third embodiment of the present invention.

FIG. 3 shows another embodiment of the present invention wherein the components are identified U+ the same reference characters as in FIGS. 1 and 2 when performing similar function. In FIG. 3, however, flyback pulses, which may be supplied by the flyback transformer, not shown, of the receiver, are utilized as the plate supply for the color killer and AGC circuit tube Q1. When a color signal is being received, a negative control voltage is supplied at the point A at the grid of the tube Q1 by the color killer detector 16. This negative control voltage is proportional to the color burst and biases off the tube Q1. The low voltage positive DC supply V+ is connected through a resistor R20 to the plate of the tube Q1. Flyback pulses are coupled to the plate of the tube Q1 through a coupling capacitor C20, so that, with the tube Q1 turned off, the plate voltage is essentially the V+ voltage plus the flyback pulse superimposed thereupon. A series circuit is provided between the plate of the tube Q1 and the point A and includes a resistor R21, the diode D3, and a resistor R22. The junction of the anode of the diode D3 and the resistor R21 defines the point C at the bottom end of the interstage coil L1. Point C is positive with respect to the point D, at the cathode of the diode D3, to forward bias the diode D3 thereby developing the AGC voltage at the points C and D. A delayed chroma AGC voltage is supplied via a resistor R23 connected between the point D and the control grid of the chroma amplifier tube Q2. The voltage at the point C is coupled via the coil L1 and the tap thereon to the control grid of the band-pass amplifier tube Q3 to supply delayed chroma AGC thereto. The resistors R21 and R22 act as delay resistors, with R21 being selected to be much larger than resistors R22 and R20.

The control voltage at the point A goes to substantially zero volts DC when a monochrome signal is being received. This causes the chroma amplifier tube Q2 to be biased to its maximum gain condition and causes the tube Q1 to be turned on. The conduction of the tube Q1 in response to the flyback pulses being applied to the plate thereof causes the plate to go to a negative potential which causes the diode D3 having its anode coupled to the plate via the resistor R21 to be reverse biased. The negative voltage developed at the point C is applied to the grid of the band-pass amplifier tube Q3 and turns off this tube thereby completing the color killer function. A cathode biasing arrangement is provided for the tube Q1 including a resistor R24, a capacitor C22, the resistor R14 and color killer threshold control potentiometer P2. As previously explained, by the adjustment of the potentiometer P2, the conduction point of the color killer tube Q1 may be controlled for variations in the cutoff voltages of various tubes.

When the diode D3 is reverse biased, this isolates point C from the point D thereby preventing interference between the color killer function which is performed on the band-pass amplifier 14 and the chroma AGC function of the circuit. When color information is again received, the diode D3 is forward biased to permit chroma AGC to be applied to both the band-pass amplifier 14 and the chroma amplifier 12 as previously described.

Although the present invention has been described with a certain degree of particularity, it should be understood that the present disclosure has been made only by way of example and that numerous changes in the details of circuitry and the combinations and arrangement of parts, elements and components can be resorted to without departing from the spirit and scope of the present invention.

I claim:

1. In a television receiver for receiving color and monochrome television signals and developing in response thereto video signals and control signals, said control signal having first and second output levels indicative of whether color or monochrome signals, respectively, are being received, the combination of:

chroma amplifying means for receiving said video signals;

band-pass amplifying means for receiving the output of said chroma amplifying means;

color killer and automatic gain control means responsive to said first output level of said control signals to supply automatic gain control signals to said chroma and said band-pass amplifying means, respectively, with said band-pass amplifying means providing an output therefrom; and said color killer and automatic gain control means being responsive to said second output level of said control signals to prohibit said band-pass amplifying means from providing an output therefrom.

2. The combination of claim 1 wherein:

said color killer and automatic gain control means developing color killer signals in response to said second output level of said control signals; and including isolating means responsive to said color killer signals for isolating the color killer and automatic gain control functions.

3. The combination of claim 2 wherein:

said color killer and automatic gain control means including; and an active device responsive to said first output level to be turned on to provide said automatic gain control signals to both said chroma and said band-pass amplifying means, and being responsive to said second output level to be turned off, with said isolating means being operative in response thereto to permit the color killer function to be performed by deactivation of said band-pass amplifying means by said color killer signals.

4. The combination of claim 3 wherein:

said color killer and automatic gain control means including;

chroma automatic gain control delay means and band-pass automatic gain control delay means for delaying the application of automatic gain control signals to said chroma and said band-pass amplifying means, respectively, with respect to said control signals to insure maximum chroma gain before the color killer function is instigated.

5. The combination of claim 3 wherein said isolating means including a switching device operatively connected to receive at opposite ends thereof said control signals and said color killer signals and being operative to be reverse biased when said color killer signals are received thereby.

6. The combination of claim 5 wherein said switching device being operatively connected between the input and output of said active device and being forward biased when said active device is turned off to permit automatic gain control signals to be applied to both said chroma and said band-pass amplifying means.

7. The combination of claim 3 wherein said isolating means including first and second switching devices, said first device being reverse biased when said active device is turned off and said second device being reverse biased when said active device is turned on to isolate thereby the color killer and automatic gain control functions.

8. The combination of claim 7 wherein said first switching device operatively connected between said band-pass amplifying means and the output of said active device, said second switching device operatively connected between said first switching device and the input of said active device, said first device being forward biased in response to the turning on of said active device to apply said color killer signals to said band-pass amplifying means, and said second device being forward biased in response to the turning off of said active device.

9. The combination of claim 3 wherein flyback pulses are periodically developed in said receiver and including:

means for applying said flyback pulse to said active device; and said active device being responsive to said second output level of said control signals and said flyback pulses to provide said color killer signals.

10. The combination of claim 9 wherein said isolation means including a switching device operatively connected between the input and output of said active device and being operative to be reverse biased by said color killer signals and said first output level of said control signals being applied thereacross.